(12) United States Patent
Nguyen et al.

(10) Patent No.: US 7,422,649 B2
(45) Date of Patent: Sep. 9, 2008

(54) METHOD FOR RECORDING INFORMATION IN LUMINESCENT COMPOSITIONS AND USES THEREOF IN ARTICLES OF MANUFACTURE

(75) Inventors: My T. Nguyen, Kirkland (CA); Marc-Andre Locas, Pierrefonds (CA); Pierre Louis Brunner, Lachine (CA); Jean-François Fortin, Pierrefonds (CA); Chuanyong Ji, Montreal (CA)

(73) Assignee: American Dye Source, Inc., Kirkland (CA)

( * ) Notice: Subject to any disclaimer, the term of this patent is extended or adjusted under 35 U.S.C. 154(b) by 407 days.

(21) Appl. No.: 10/937,347

(22) Filed: Sep. 10, 2004

(65) Prior Publication Data

US 2005/0103424 A1 May 19, 2005

Related U.S. Application Data

(60) Provisional application No. 60/502,226, filed on Sep. 12, 2003.

(51) Int. Cl.
*B29C 65/00* (2006.01)
(52) U.S. Cl. ............ 156/272.2; 156/272.8; 252/301.16; 106/31.13
(58) Field of Classification Search ............ 156/272.2, 156/67, 277; 283/72, 86, 92, 95, 109, 110, 283/114; 428/916; 252/301.16; 106/31.13, 106/31.17, 31.2, 31.27, 31.32
See application file for complete search history.

(56) References Cited

U.S. PATENT DOCUMENTS 3,801,782 A  4/1974  Dorion
4,756,963 A * 7/1988  Yamamoto et al. ....... 428/32.81
5,755,860 A * 5/1998  Zhu ........................ 106/31.15
5,837,042 A  11/1998  Lent et al.

(Continued)

FOREIGN PATENT DOCUMENTS

CA      2449171      12/2002
WO    WO98/22291     5/1998
WO    WO 02/04223    1/2002

OTHER PUBLICATIONS

McGehee, M. D., Bergstedt, T., Zhang, C., Saab, A. P., O'Regan M. B., Bazan, G. C., Srdanov, V. I., Heeger, A. J. *Narrow Bandwidth Luminescence from Blends with Energy Transfer from Semiconducting Conjugated Polymers to Europium Complexes*, Advanced Materials 1999, 11 (16).p. 1349-1354.

Trattnig, G., Pogantsch, A., Langer, G., Kern, W., Zojer E. *Polymer-based red, gren, and blue emitting devices fabricated by reductive photopatterning*, Applied Physics Letters 2002, 81 (22). p. 1-3.

*Primary Examiner*—Jeff H Aftergut
*Assistant Examiner*—Daniel McNally
(74) *Attorney, Agent, or Firm*—Goudreau Gage Dubuc

(57) ABSTRACT

Described herein are a method for recording luminescent compositions, comprising a) providing a luminescent composition which comprises at least a first and second luminescent compound, wherein the first luminescent compound is a donor compound having a peak luminescent emission spectrum at a given wavelength, wherein the second luminescent compound is an acceptor compound having a peak absorption spectrum at a longer wavelength than the given wavelength, and wherein the emission spectrum of the donor compound at least partially overlaps the absorption spectrum of the acceptor compound; b) combining the composition with a substrate, so that at least a portion of the composition is available for exposure to a photon source; and c) embedding information at predetermined sites in the combined composition by localized exposure to a photon source, the embedding resulting in an information pattern when exposed to a luminescence deciphering device, and uses of said information pattern.

45 Claims, 6 Drawing Sheets

U.S. PATENT DOCUMENTS 6,046,925 A * 4/2000 Tsien et al. .................. 365/111
6,899,752 B2 * 5/2005 Sekioka et al. ........... 106/31.32
2002/0079249 A1 6/2002 Lawandy et al.
2004/0220298 A1 * 11/2004 Kozee et al. ................ 523/160

* cited by examiner

US 7,422,649 B2

METHOD FOR RECORDING INFORMATION IN LUMINESCENT COMPOSITIONS AND USES THEREOF IN ARTICLES OF MANUFACTURE

CROSS REFERENCE TO RELATED APPLICATIONS

This application claims priority, under 35 U.S.C. § 119(e), of U.S. provisional application Ser. No. 60/502,226, filed on Sep. 12, 2003 and now expired.

FIELD OF THE INVENTION

This invention is related to a method for recording information in luminescent compositions. This invention is also related to possible uses of information-containing compositions obtained according to the method of the present invention. It has advantageous applications in security printing, laser marking, anti-counterfeiting, automatic identification, chemical sensors, bio-sensors, laser imaging and display devices.

BACKGROUND OF THE INVENTION

Several approaches were taught in the prior art to produce single and multiple colored luminescent images for applications in security printing, laser marking, anti-counterfeiting, automatic identification and digital imaging. For example, U.S. Pat. Nos. 5,755,860 and 5,837,042 taught the use of inkjet printing process for application in anti-counterfeiting. This printing process uses invisible ink compositions containing fluorescent colorants to produce luminescent images.

U.S. patent application Ser. No. 2002/0079249 disclosed a method and apparatus employing multi-spectra images for the remote identification and sorting of objects. The luminescent compositions contain fluorescent dyes or pigments, which were applied onto substrate by different printing and heat-sealing processes.

PCT application WO 02/04223 disclosed the injection molding of plastic compositions containing a luminescent compound, which irreversibly changes to non-luminescence upon exposure to laser radiation. Such compositions do not exhibit multiple luminescent color changes and require high radiation energy to encode the information or marking.

Research has also been done on fluorescent resonance energy transfer (FRET) between some conjugated blue emitting polymers and rare-earth metal complexes, to achieve a pure red emission for example, which is known to be difficult to obtain[1]. A control of such an energy transfer on precise locations on a polymeric film would possibly lead to a patterned Red-Blue-Green (RBG) emission on a single-layer emitting device[2].

However, the prior art fails to disclose methods for recording information in luminescent compositions by simple exposure to a photon source under ambient conditions.

Thus remains a need for such methods for recording information in luminescent compositions by simple exposure to a photon source under ambient conditions.

The present invention seeks to meet this and other needs.

SUMMARY OF THE INVENTION

The present invention relates to a method for recording information in luminescent compositions, for applications in security printing, anti-counterfeiting, automatic identification, chemical sensors, bio-sensors, laser marking, laser imaging and display devices.

The present invention further relates to possible uses of such information-containing compositions into or onto different substrates, devices or articles of manufacture.

More specifically, the present invention relates to a method for recording information in a luminescent composition, comprising:

a) providing a luminescent composition which comprises, in a suitable carrier or diluent, at least a first and second luminescent compound, wherein the first luminescent compound is a donor compound having a peak luminescent emission spectrum at a given wavelength, wherein the second luminescent compound is an acceptor compound having a peak absorption spectrum at a longer wavelength than the given wavelength, and wherein the emission spectrum of the donor compound at least partially overlaps the absorption spectrum of the acceptor compound;

b) combining the composition with a substrate, so that at least a portion of the composition is available for exposure to a photon source, and;

c) embedding information at predetermined sites in the combined composition by localized exposure to a photon source, the embedding resulting in an information pattern when exposed to a luminescence deciphering device.

The present invention further relates to uses of an information pattern as obtained according to the method of the present invention for security printing, anti-counterfeiting, automatic identification, chemical sensors, bio-sensors, laser marking, laser imaging or display devices.

The present invention further relates to the use of an information pattern as obtained according to the method of the present invention in articles of manufacture.

The present invention further relates to an article of manufacture comprising an information pattern as obtained according to the method of the present invention.

Other objects and further scope of applicability of the present invention will become apparent from the detailed nonrestrictive description given hereinafter. It should be understood, however, that this detailed description with reference to the accompanying drawings, while indicating preferred embodiments of the invention, is given by way of illustration only, since various changes and modifications within the spirit and scope of the invention will become apparent to those skilled in the art.

Figure 4:
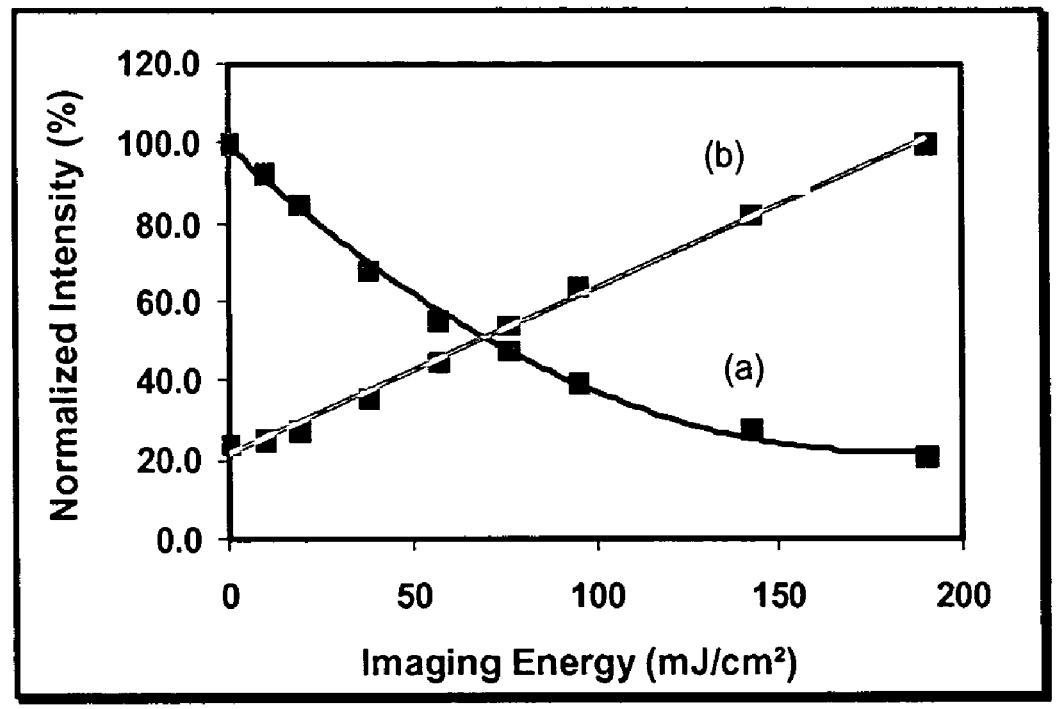
Figure 5:
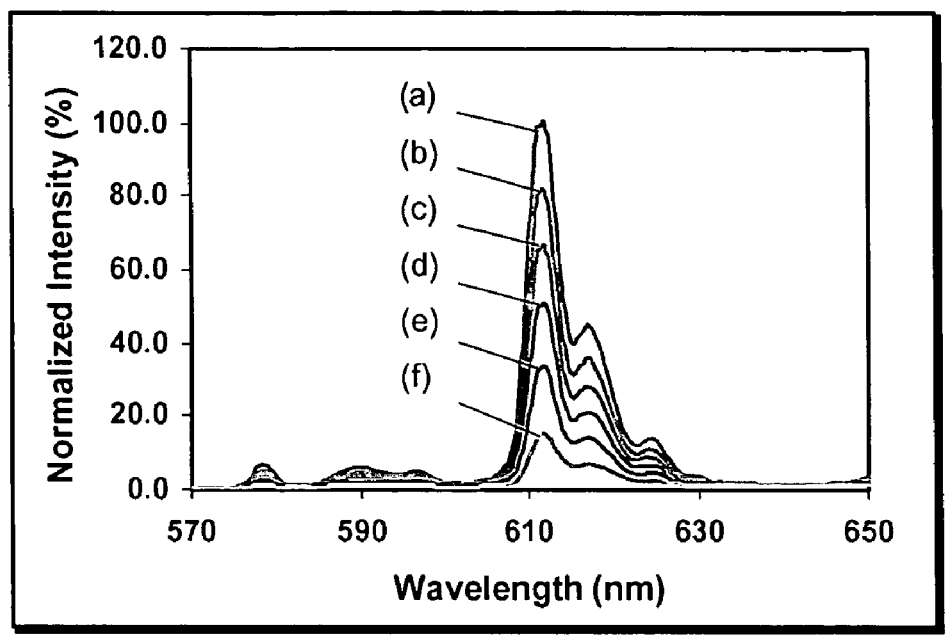
Figure 6:
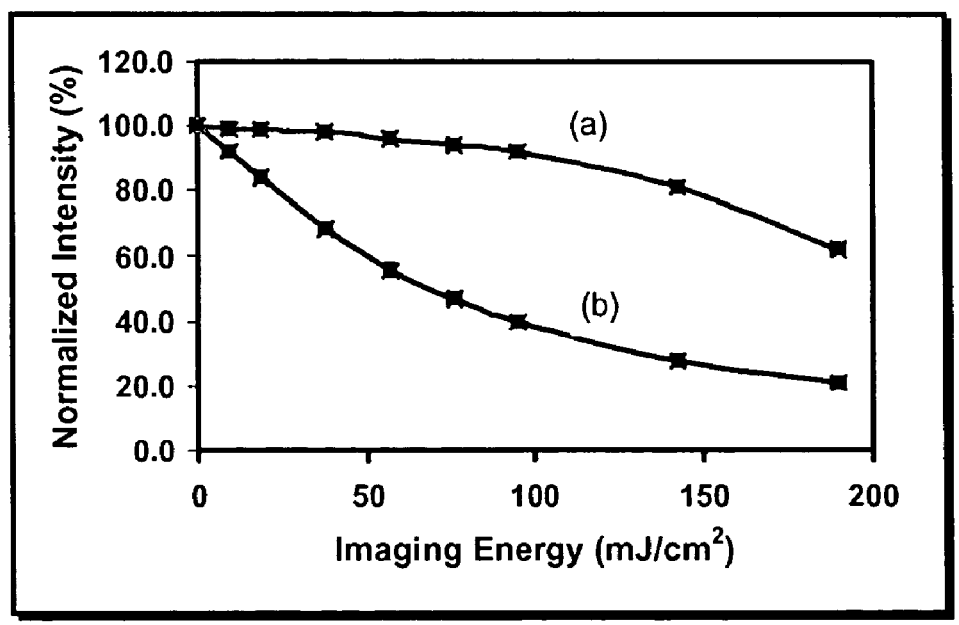
Figure 7:
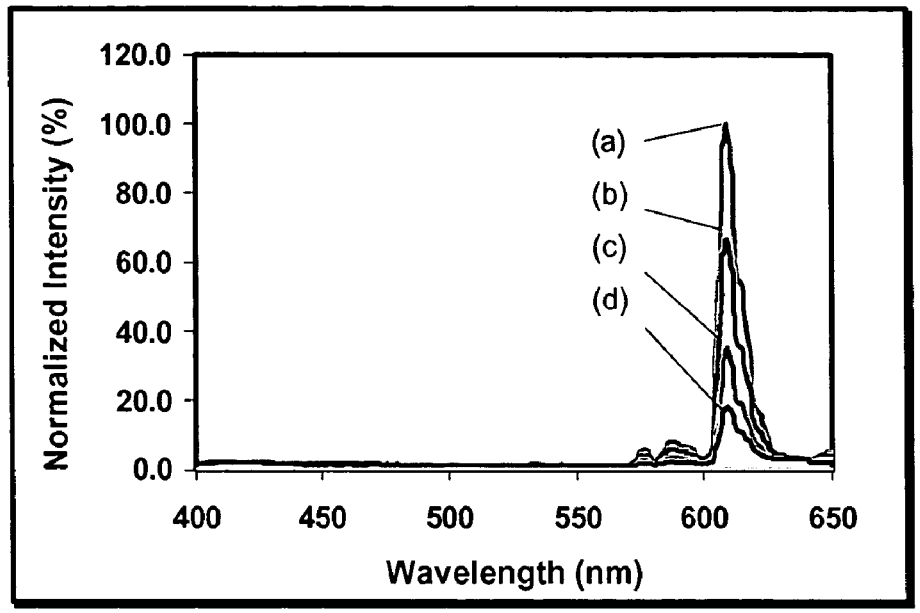
Figure 8:
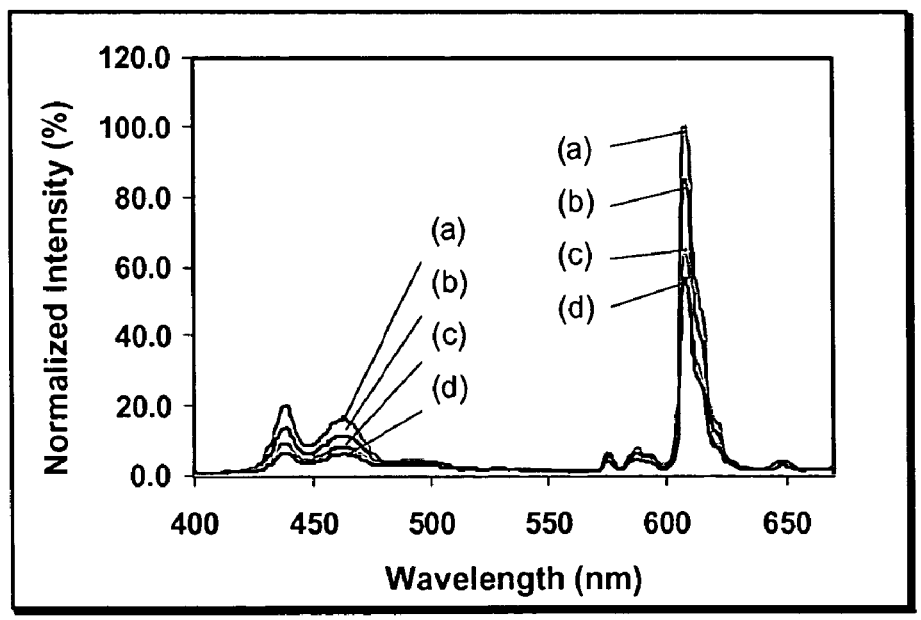
Figure 9:
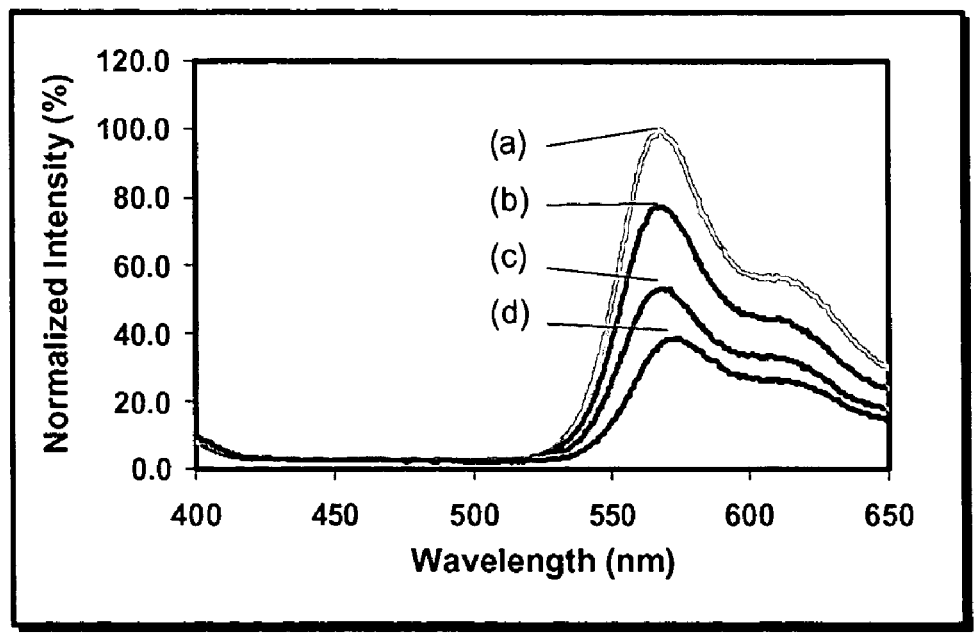
Figure 10:
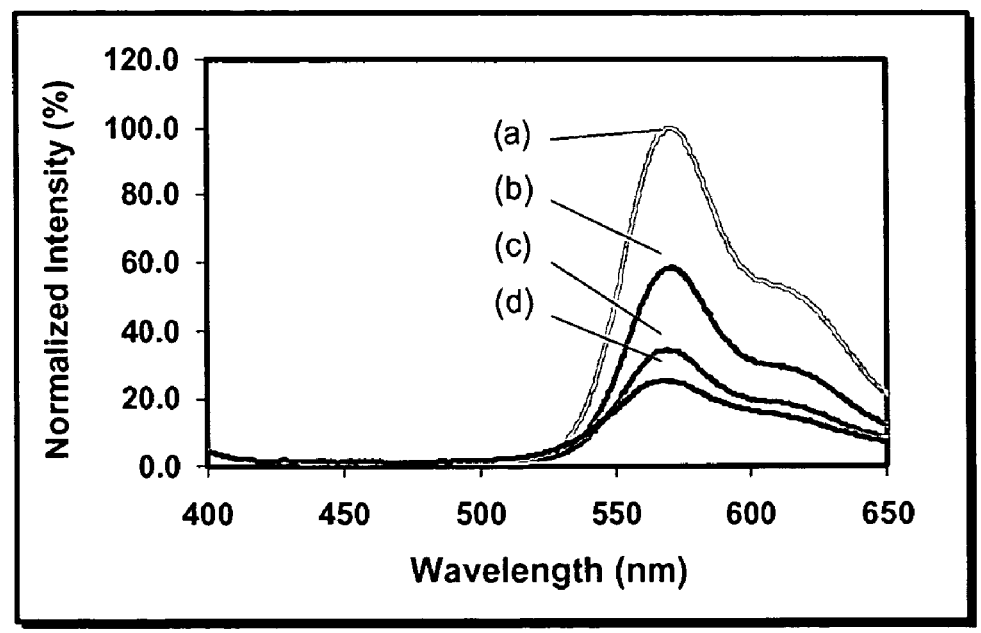
Figure 11:
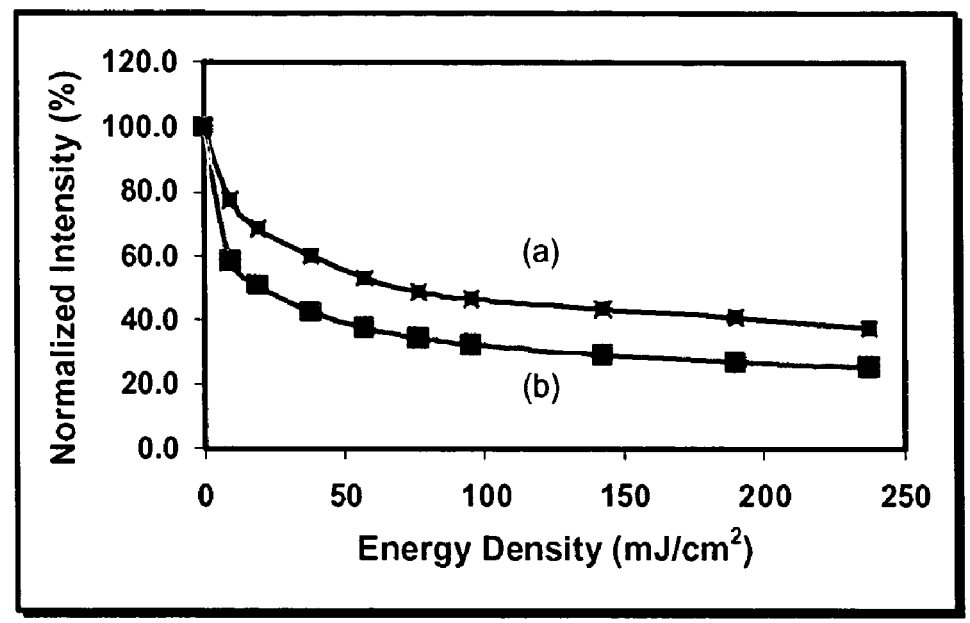
Figure 12:
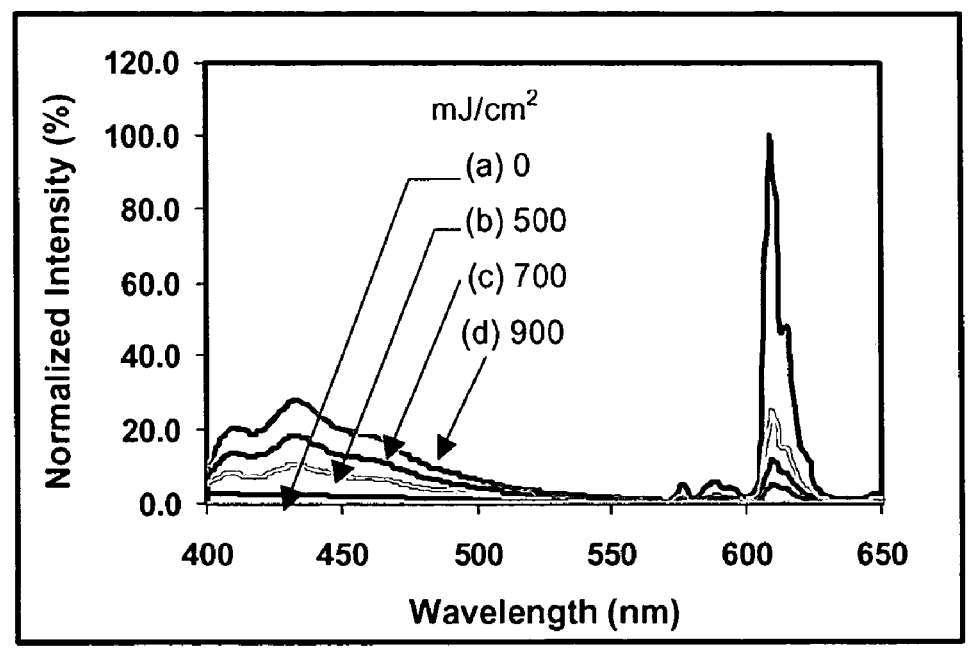

FIG. 4 shows the changes in the intensity of the luminescent peaks of (a) tris(dibenzoylmethane)mono(phenanthroline)-europium (III) at 612 nm, and (b) of UVITEX OB at 432 nm in the composition of Example 3;

FIG. 5 shows the luminescent spectra of the luminescent composition containing tris(dibenzoylmethane)mono(phenanthroline)europium (III) and polyvinyl carbazole of Example 4, which was coated on polyester film and imaged with a triple Nd:YAG laser at (a) 0 mJ/cm$^2$, (b) 19.0 mJ/cm$^2$, (c) 47.5 mJ/cm$^2$, (d) 95.0 mJ/cm$^2$, (e) 142.5 mJ/cm$^2$ and (f) 190.0 mJ/cm$^2$;

FIG. 6 shows the changes in the intensity of the luminescent peak at 612 nm of (a) the luminescent composition containing tris(dibenzoylmethane)mono(phenanthroline)europium (III) of Example 1 and (b) the luminescent composition containing tris(dibenzoylmethane)mono(phenanthroline)europium (III) and polyvinyl carbazole of Example 4;

FIG. 7 shows the luminescent spectra of the luminescent composition containing tris(dibenzoylmethane)mono(phenanthroline)europium (III) and poly[2-(6-cyano-6-methylheptyloxy)-1,4-phenylene] of Example 5, which was coated on polyester film and imaged with a triple Nd:YAG laser at (a) 0 mJ/cm$^2$, (b) 28.5 mJ/cm$^2$, (c) 142.5 mJ/cm$^2$, and (d) 190.0 mJ/cm$^2$;

FIG. 8 shows the luminescent spectra of the luminescent composition containing tris(dibenzoylmethane)mono(phenanthroline)europium (III) and poly(9,9-dioctylfluorenyl-2,7-diyl) of Example 6, which was coated on polyester film and imaged with a triple Nd:YAG laser at (a) 0 mJ/cm$^2$, (b) 9.5 mJ/cm$^2$, (c) 76.0 mJ/cm$^2$, and (d) 190.0 mJ/cm$^2$;

FIG. 9 shows the luminescent spectra of the luminescent composition containing poly[2-methoxy-5-(2-ethylhexyloxy)-1,4-phenylene vinylene] of Example 7, which was coated on polyester film and imaged with a triple Nd:YAG laser at (a) 0 mJ/cm$^2$, (b) 28.5 mJ/cm$^2$, (c) 142.5 mJ/cm$^2$, and (d) 190.0 mJ/cm$^2$;

FIG. 10 shows the luminescent spectra of the luminescent composition containing poly[2-methoxy-5-(2-ethylhexyloxy)-1,4-phenylene vinylene] and UVITEX OB of Example 8, which was coated on polyester film and imaged with a triple Nd:YAG laser at (a) 0 mJ/cm$^2$, (b) 28.5 mJ/cm$^2$, (c) 142.5 mJ/cm$^2$, and (d) 190.0 mJ/cm$^2$;

FIG. 11 shows the changes in the intensity of the luminescent peak at 570 nm of (a) the luminescent composition containing poly[2-methoxy-5-(2-ethylhexyloxy)-1,4-phenylene vinylene] of Example 7 and (b) the luminescent composition containing poly[2-methoxy-5-(2-ethylhexyloxy)-1,4-phenylene vinylene] and UVITEX OB of Example 8, and FIG. 12 shows shows the luminescent spectra of the luminescent composition containing tris(dibenzoylmethane)mono(phenanthroline)europium (III), UVITEX OB and poly(m-ethylmethacrylate) of Example 10, which was coated on polyester film and imaged with a 2000 Watt Mercury lamp at (a) 0 mJ/cm$^2$, (b) 500 mJ/cm$^2$, (c) 700 mJ/cm$^2$, (d) 900 mJ/cm$^2$.

DETAILED DESCRIPTION OF THE INVENTION

In general terms, the present invention relates to a method for recording information in luminescent compositions for applications such as security printing, anti-counterfeiting, automatic identification, chemical sensors, bio-sensors, laser marking, laser imaging and display devices. The luminescent compositions used in the present invention can be selectively imaged with a photon source to provide single or multiple colored luminescent images via fluorescent and/or phosphorescent emissions upon exposure to radiation having a shorter wavelength than the luminescent wavelength. The present invention further relates to possible uses of such compositions into or onto different substrates, devices or articles of manufacture.

As used herein, the term "luminescent" refers to a material or composition being capable of emitting light by exposure to light waves, such as low intensity UV radiation (photoluminescence) and under applied electric current (electroluminescence). The term "luminescent" also encompasses herein fluorescent and phosphorescent.

As used herein when referring to an organic material, the term "conjugated" means that the material contains alternate single and double bonds.

As used herein, the term Fluorescent Resonance Energy Transfer (FRET) refers to a process whereby the electronic excitation energy of a donor luminescent compound (D) is non-radiatively transferred to a nearby acceptor molecule (A) via a through-space dipole-dipole interaction between the donor-acceptor pair. FRET occurs when there is appreciable overlap between the emission spectrum of the donor and the absorption spectrum of the acceptor. It results in partial or complete reduction of the donor luminescence.

Method for Recording Information in Luminescent Compositions:

In general terms, the method of the present invention comprises the basic steps of:
a) providing a luminescent composition comprising at least two luminescent compounds in a suitable carrier or diluent;
b) combining the luminescent composition with a substrate, so that at least a portion of the composition is available for exposure to a photon source; and
c) embedding information at predetermined sites in the combined composition by localized exposure to a photon source;

the embedding resulting in an information pattern when exposed to a luminescence deciphering device.

Luminescent Compositions:

The luminescent compositions used in the method of the present invention comprise at least a first and second luminescent compound, wherein the first luminescent compound is a donor compound having a peak luminescent emission spectrum at a given wavelength, wherein the second luminescent compound is an acceptor compound having a peak absorption spectrum at a longer wavelength than the given wavelength, and wherein the emission spectrum of the donor compound at least partially overlaps the absorption spectrum of the acceptor compound. Indeed, it has surprisingly been discovered that such total or partial overlapping of spectra provides faster speeds during recording of information with a photon source. It has also been discovered that such total or partial overlapping of spectra provides multiple color luminescent images when deciphering the recorded information pattern.

More specifically, the luminescent compounds contained in the compositions used in the present invention include organic materials and organic metal complexes. The organic materials of this invention may contain conjugated or non-conjugated backbones and may exhibit peak luminescent properties when exposed to radiations of between 370 and 1100 nm.

Preferred conjugated organic materials of this invention are dimers, oligomers, polymers, copolymers and dendrimers, which contain the monomer units derived from phenylene, biphenylene, naphthalene, anthracene, fluorene, bifluorene, spirofluorene, phenylene-vinylene, carbazole, pyrene, arylamine, thiophene, bithiophene, benzo(2,1',3)

thiadiazol, phenanthroline and their derivatives. The basic structures of the preferable conjugated materials of this invention are as follows:
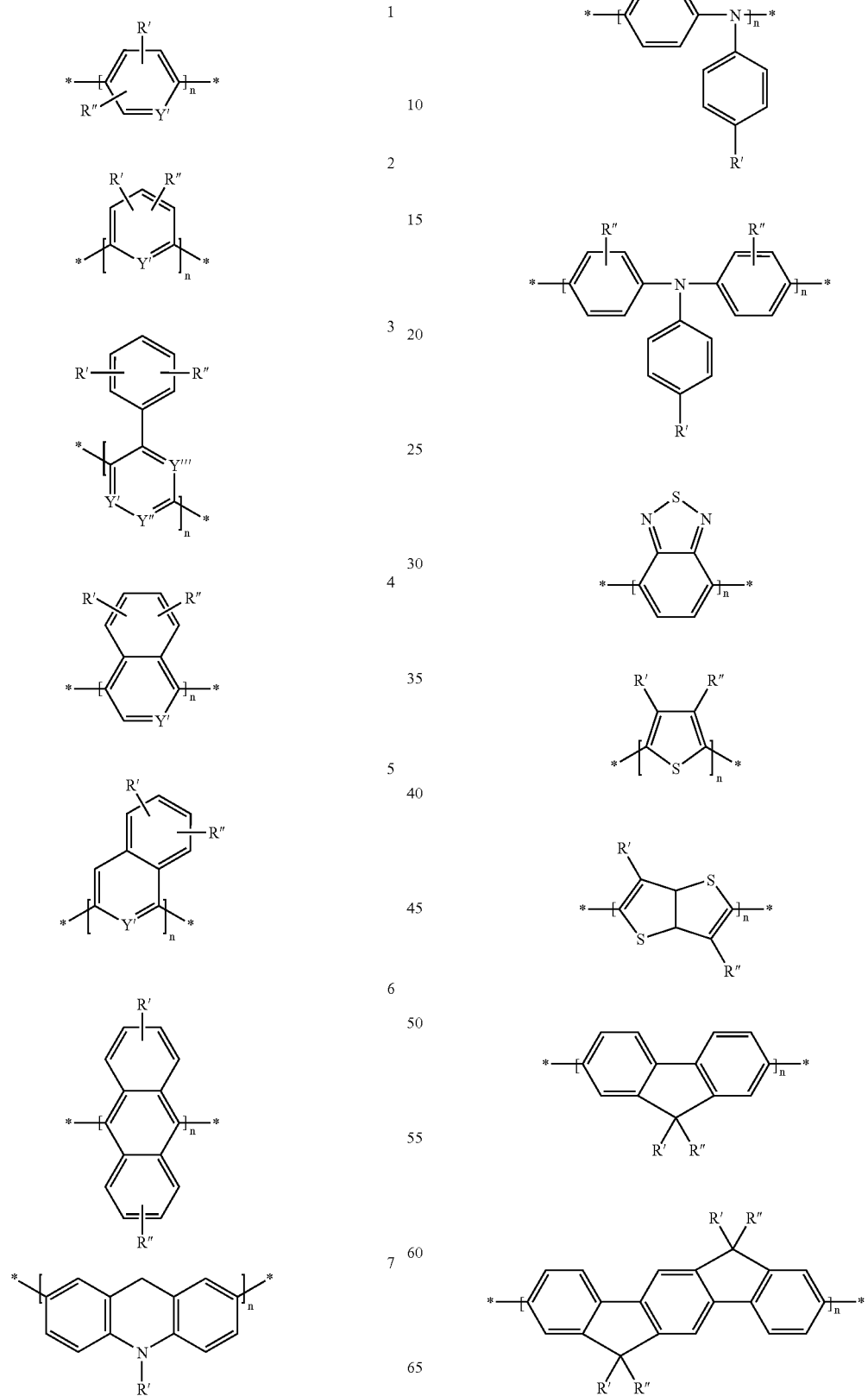

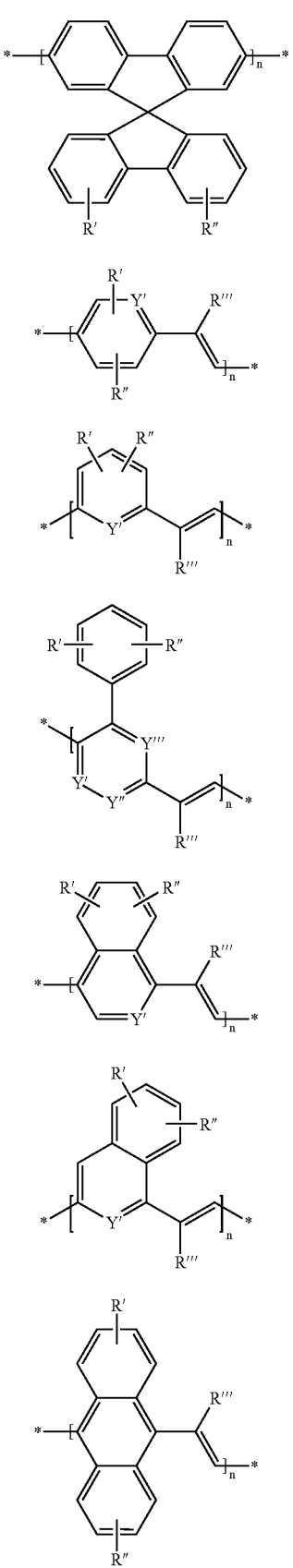
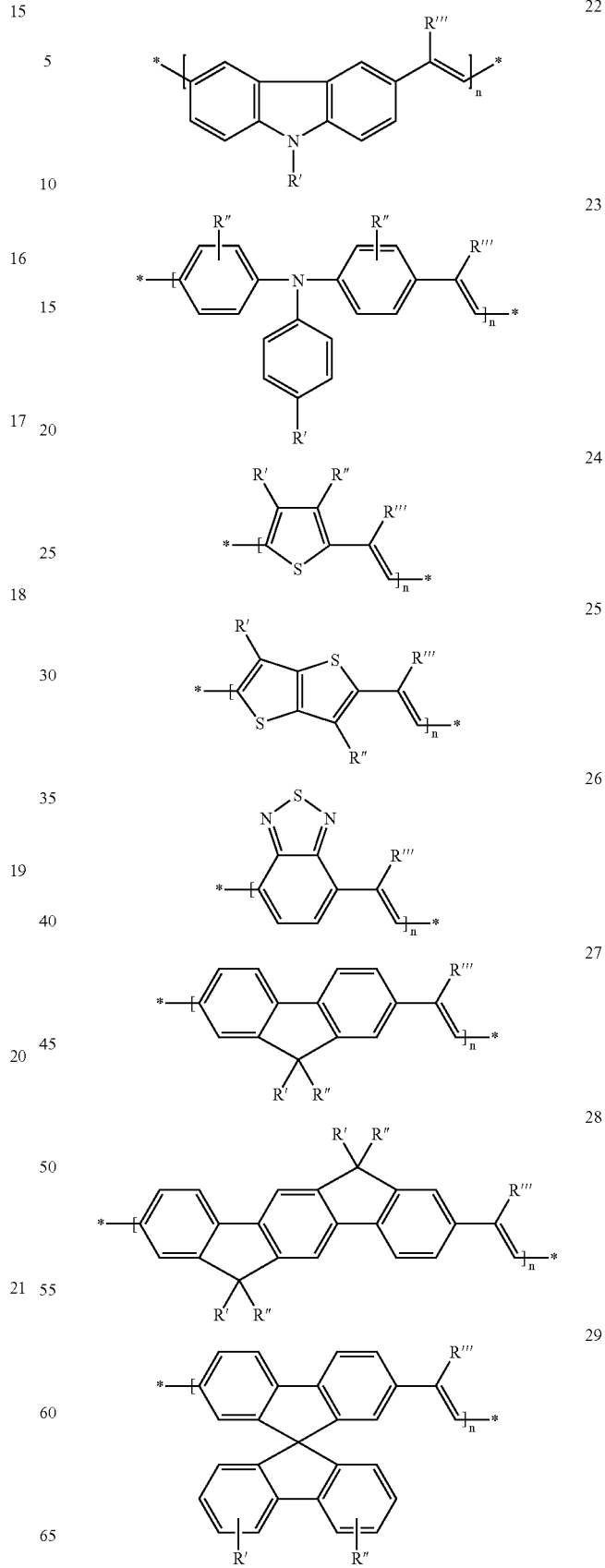

-continued

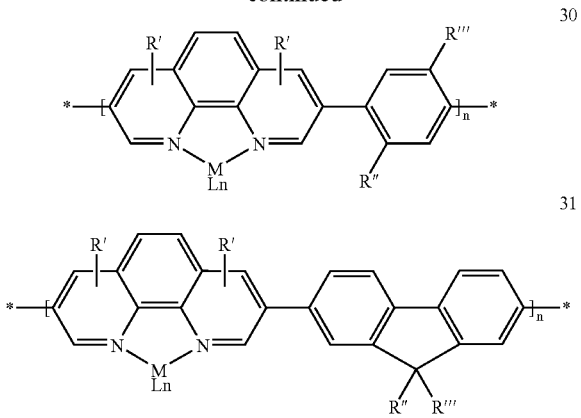

wherein:
R' and R" are identical or different, each a straight-chain or branched or cyclic alkyl, where one or more nonadjacent $CH_2$ groups are optionally replaced by —S—, —CO—, —COO—, —O—CO—, —$NR^1$—, —$(NR^2 R^3)^+$-$A^-$, or —$CONR^4$— or a straight-chain or branched or cyclic alkoxy group having 1 to 20 carbon atoms where one or more nonadjacent $CH_2$ groups are replaced by —O—, —S—, —CO—, —COO—, —O—CO—, —$NR^1$—, —$(NR^2R^3)^+$-A, or —$CONR^4$— and one or more H atoms in each case may be replaced by F, or else CN, F, Cl or any aryl group having from 4 to 14 carbon atoms which are optionally substituted by one or more nonaromatic radicals;

R''' is H or CN;

$R^1$, $R^2$, $R^3$, $R^4$: identical or different, aliphatic or aromatic hydrocarbon radicals having from 1 to 20 carbon atoms or else H;

Y', Y", Y''' are identical or different and are CH or N;

n varies from 2 to 1,000,000;

M Ln is the metal complex, which derives from LiBr, $Mg(OCOCH_3)_2$, $Zn(OCOCH_3)_2$, $Al_2(SO_4)_3$, $FeCl_3$, $CoCl_2$, $NiCl_2$, $CuCl_2$, $PdCl_2$, $AgPF_6$ or $LaCl_3$.

The more preferable M Ln has one of the following structures

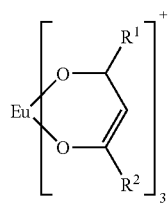

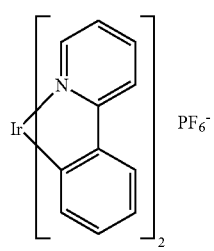

wherein $R^1$ and $R^2$ are defined as above.

The preferred conjugated organic materials of this invention are:
4,4'-Bis(9-ethyl-3-carbazolevinylene)-1,1'-biphenyl;
9,10-Bis[(9-ethyl-3-carbazoyl)-vinylenyl]-anthracene;
4,4'-Bis(diphenylvinylenyl)-biphenyl;
1,4-Bis(9-ethyl-3-carbazolvinylene)-2-methoxy-5-(2-ethylhexyloxy)-benzene;
1,4-Bis(9-ethyl-3-carbazolvinylene)-2,5-di(2-ethylhexyloxy)-benzene;
4,4'-Bis(diphenylvinylenyl)anthracene;
1,4-Bis(9-ethyl-3-carbazovinylene)-9,9-dihexylfluorene; and
1,4-Bis(9-ethyl-3-carbazovinylene)-9,9-dioctylfluorene.

The preferred non-conjugated organic compounds of this invention are dimers, oligomers, polymers, copolymers and dendrimers, which contain the monomer units derived from acrylate, methacrylate, styrene, epoxide, vinyl alcohol, carbonate, amide and urethane. They must contain fluorescent and/or phosphorescent pendant groups or end groups. The preferred fluorescent and or phosphorescent pendant groups are carbazole, pyrene, anthracene, thioxanthone, pyrelene imide, xanthane, europium complexes, iridium complexes, aluminum complexes, ruthenium complexes and zinc complexes.

The luminescent compounds described in this invention may also be organic molecules, which are known as optical brighteners. The preferred optical brighteners of this invention exhibit strong fluorescence or phosphorescence between 370 and 1100 nm, which are Uvitex OB, Uvitex OB-C, Uvitex OB-P, Uvitex NFW, Uvitex FP, Uvitex FP-C, Tinopal SFP and Tinopal MSP, which are commercially available form Ciba Specialty Chemicals.

Other useful optical brighteners can be found in Kirk-Othmer Encyclopedia of Chemical Technology, 4, "Fluorescent Brighteners", pp. 213-225 (1978), and include the stilbene derivatives such as 4,4'-bis(triazin-2-ylamino)stilbene-2,2'-disulfonic acid derivatives wherein the triazinyl groups are substituted with suitable substituents, including substituents such as anilino, sulfanilic acid, metanilic acid, methylamino, N-methyl-N-hydroxyethylamino, bis (hydroxyethylamino), morpholino, diethylamino, and the like; mono(azol-2-yl)stilbenes such as 2-(stilben-4-yl)naphthotriazoles and 2-(4-phenylstilber-4-yl)benzoxazoles; bis(azol-2-yl)stilbenes such as 4,4'-bis(triazol-2-yl)stilbene-2,2'-disulfonic acids; styryl derivatives of benzene and biphenyl such as 1,4-bis(styryl)benzenes and 4,4' bis(styryl)biphenyls; pyrazolines such as 1,3-diphenyl-2-pyrazolines; bis(benzazol-2-yl) derivatives having as phenyl ring substituents alkyl, COO-alkyl, and SO.sub.2-alkyl; bis(benzoxazol-2-yl) derivatives; bis(benzimidazol-2-yl) derivatives such as 2-(benzofuran-2-yl)benzimidazoles; coumarins such as 7-hydroxy and 7-(substituted amino) coumarins, 4-methyl-7-amino-coumarin derivatives, esculetin, .beta.-methylumbelliferone, 3-phenyl-7-(triazin-2-ylamino)coumarins, 3-phenyl-7-aminocoumarin, 3-phenyl-7-(azol-2-yl)coumarins, and 3,7-bis(azolyl) coumarins; carbostyrils, naphthalimides, alkoxynaphthalimides, derivatives of dibenzothiophene-5,5-dioxide, pyrene derivatives, and pyridotriazoles.

The luminescent materials described in this invention can also be organic metal complexes. The preferred organic metal complexes of this invention are derived from europium, zinc, iridium, aluminum, gallium and terbium.

Examples of such materials are:
Tris(benzoylacetonato)mono(phenanthroline)europium (III),
Tris(dibenzoylmethane)mono(phenanthroline)europium (III), Tris(dibenzoylmethane)mono(5-aminophenanthroline) europium (III),
Tris(dinaphthoylmethane)mono(phenanthroline)europium (III),
Tris(dibiphenoylmethane)mono(phenanthroline)europium (III),
Tris(dibenzoylmethane)mono(4,7-dimethylphenanthroline)europium (III),
Tris(dibenzoylmethane)mono(4,7-diphenylphenanthroline)europium (III),
Bis(8-hydroxyquinolato)zinc
Bis(2-methyl-8-hydroxyquinolato)zinc,
Iridium (III) tris(2-phenylpyridinato-N,$C^{2'}$)picolate,
Iridium (III) tris(2-(4-tolyl)pyridinato-N,$C^{2'}$)picolinate,
Iridium (III) bis(2-(4,6-difluorophenyl)pyridinato-N,$C^{2'}$),
Iridium (III) bis(2-(2'-benzothienyl)pyridinato-N,$C^{3'}$) (acetylacetonate),
Tris(8-hydroxyquinolato)aluminium (III),
Tris(2-methyl-8-hydroxyquinolato)aluminium (III),
Tris(8-hydroxyquinolato)gallium (III),
Tris(2-methyl-8-hydroxyquinolato)gallium (III),
Tris(3-methyl-1-phenyl-4-trimethyl-acetyl-5-pyrazoline) terbium (III)

The at least two luminescent compounds may also be combined as a single complex material, as in examples 11 and 12.

The luminescent compositions used in the method of the present invention also include well-known additives, suitable carriers or diluents, nonlimiting examples of which are viscosity modifiers, plasticizers, tackifiers, stabilizers, resins and binders.

Optionally, polymeric binder resins can be incorporated into the luminescent compositions of this invention to improve the film forming properties. The preferred polymeric binder resins are meth(acrylate) polymers, urethane polymers, carbonate polymers, ester polymers, amide polymers and other engineering plastics, which do show essentially no luminescent emission between 370 and 1100 nm.

Optionally, organic stabilizers can be incorporated into the luminescent compositions of this invention to improve the thermal and photo properties. The preferred organic stabilizers are commercially available from Ciba, such as Tinuvin 292, Tinuvin 144, Tinuvin 123, Tinuvin 328, Tinuvin 384, Tinuvin 900, Tinuvin 928, Tinuvin 1130, Tinuvin 400, Irganox 1010, Irganox 1076, Irganox 1035, Irganox MD 1024, Irganox B 225, Irganox B 900, Irganox B 921, Irganox LM 91, Irgacor 153, Irgacor 252LD, Irgacor FC, Irgacor 1405 and Irgacor 1930. The chemical names of these above organic stabilizers can be found in the "Additives for Trade Sales and Industrial Coatings, Formulators Guide" available from Ciba Specialty Chemicals, 540 White Plains Road, Tarrytown, N.Y. 10591-9005.

Preferably, the luminescent compositions used in the present invention exhibit strong luminescent properties at emission wavelengths between 400 and 1100 nm.

Combining the Luminescent Compositions with a Substrate

Before exposure to a photon source for embedding information, a luminescent composition used in the method of the present invention is combined with a substrate, in such a way that at least a portion of the composition is available for exposure to the photon source.

Examples of various possible substrates are plastics, papers, metal films, wood, glass and ceramic surfaces, devices such as flexible displays or any other article of manufacture.

The combining may be achieved, for example, by conventional coating, spraying and jetting techniques.

The combining can also be achieved by melt mixing, solvent casting, hot melt casting, extrusion and laminating techniques into the bulk of any polymeric article. In this case, polymeric binder resins may not be needed.

When the combining consists in layering the composition onto a film for example, an additional step of laminating may occur onto a secondary substrate, before or after exposure to the photon source. Such secondary substrate may be plastic, cardboard, paper, metal film, glass, ceramic surface or any other article of manufacture.

Information Recording

Graphical or written information patterns can be recorded in luminescent compositions by exposure of such compositions to a photon source such as laser light, UV LED (Light Emitting Diode) or UV radiation (mercury light, for example).

As stated above, the luminescent compositions used in the method of the present invention comprise at least a first and second luminescent compounds, wherein the first luminescent compound is a donor compound having a peak luminescent emission spectrum at a given wavelength, wherein the second luminescent compound is an acceptor compound having a peak absorption spectrum at a longer wavelength than the given wavelength, and wherein the emission spectrum of the donor compound at least partially overlaps the absorption spectrum of the acceptor compound.

The method of the present invention is firstly based on the general principle of FRET between the two luminescent compounds, acceptor A and donor D. FRET arises when such an A and D mix is submitted to UV light for example: compound D has a peak luminescent emission spectrum at a shorter wavelength than the peak absorption spectrum of A and the emission energy of D is absorbed by A. The energy transfer occurs causing A to emit brighter fluorescence at its proper wavelength (corresponding to a given color of the composition).

Surprisingly, it has been found that upon exposure to an increasing imaging energy density, the behavior of both luminescent materials A and D as described above in the composition, as observed under UV light, varies. Indeed, as the imaging energy density increases, the very bright color of A, observed under UV light, progressively decreases in favor of the color of D. In fact, the FRET effect is possibly gradually "replaced" by the destruction of the luminescent material A, thereby preventing A from accepting anymore energy from D. This phenomenon results in the restoration of the luminescence of D (giving another color to the composition under subsequent UV radiation).

Using the synergistic properties of two "overlapping" luminescent materials in a method according to the present invention allows increasing the imaging efficiency.

It is to be understood that several parameters can be varied in order to obtain various colors, color changes, and color intensities. The nature, number, and concentration of the luminescent materials in the compositions, as well as the intensity of the photon source indeed play a very important role in the resulting imaged composition.

The preferred intensities or energy densities of the photon sources used in the method of the present invention vary between 20 and 200 mJ/cm$^2$ for a laser light, preferably between 50 and 200 mJ/cm$^2$, and between 200 and 900 mJ/cm$^2$ for a UV light.

Upon exposure to a photon source for embedding information, the fluorescence and phosphorescence of the compositions change in intensity or emission wavelength without significantly changing their absorption characteristics.

Therefore, it is also to be understood that the recorded information pattern remains essentially invisible under ambient light and that an additional deciphering step allows visualizing the information pattern. The recorded information pattern indeed becomes clearly discernable when exposed to, for example, black lamps, low intensity UV radiation, laser light, CCD cameras or under applied electric field.

During the deciphering step, the information pattern may emit in red, green and blue, defining a full color spectrum, and alternatively become colorless. The color change (from red to blue, for example, or from a given color to colorless) then allows distinguishing between the non-exposed and the exposed parts of a composition and delimiting the recorded information pattern.

As a general rule, the color seen with the luminescence deciphering device, prior to or without exposure to a photon source, is that of the acceptor compound A, and the color seen after exposure to the photon source is that of the donor compound D.

Moreover, the compositions used in the method of the present invention may comprise more than two luminescent compounds, which gives multiple color change possibilities.

The energy density used for deciphering information patterns obtained according to the method of the present invention is usually below 1 mJ/cm$^2$.

There are many possible uses of the information-containing compositions as obtained by the method of the present invention. Non-limiting examples of such uses are security printing, anti-counterfeiting, automatic identification, chemical sensors, bio-sensors, laser marking, laser imaging and display devices.

Many articles of manufacture may comprise information patterns obtained according to the method of the present invention, such as but not limited to credit card like articles, tear tape for packaging purposes, and flexible or rigid full color displays.

Although the present invention has been described herein by way of preferred embodiments, it can be modified without departing from the spirit and nature of the subject invention as defined in the appended claims.

EXAMPLE 1

Figure 1:
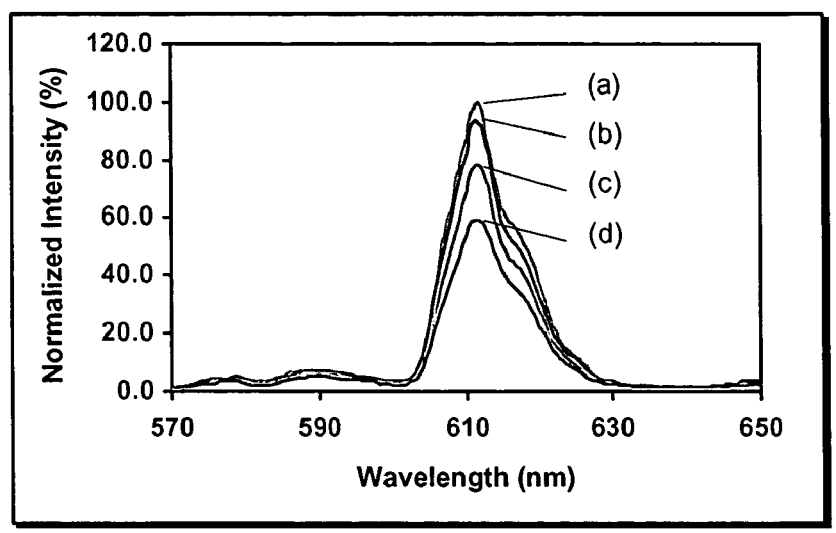
FIG. 1 shows the luminescent spectra of the luminescent composition containing tris(dibenzoylmethane)mono(phenanthroline)europium (III) and poly(methylmethacrylate) of Example 1, which was coated on polyester film and imaged with a triple Nd:YAG laser at (a) 0 mJ/cm$^2$, (b) 95.0 mJ/cm$^2$, (c) 142.5 mJ/cm$^2$, and (d) 190.0 mJ/cm$^2$.

One gram of tris(dibenzoylmethane)mono(phenanthroline)europium (III) (ADS051RE, available from American Dye Source, Inc.) was dissolved in 200 ml toluene solution containing 20 grams poly(methylmethacrylate) (Molecular weight 120,000, available from Sigma Aldrich). The solution was coated on Mylar film using wire-wound bar. Uniform colorless film was obtained after drying with hot air gun. When excited with ultraviolet light (i.e., 370 nm), the film emits a bright red color light and the luminescent spectrum shows the fluorescent peak at 612 nm. The film was then imaged using a triple Nd-YAG laser (355 nm, available from Spectra Physics) at different energy densities. No visual color change was observed with the naked eyes. However, upon exposure to deciphering ultraviolet light (i.e., 370 nm), the luminescent color of the image area changes gradually from red to colorless with increasing laser imaging doses. FIG. 1 shows the luminescent spectra of the image area with different laser imaging doses.

This example shows that the fluorescent peak of the europium complex as the only luminescent compound in the coating loses up to 40% intensity upon exposure to laser light at 190 mJ/cm$^2$.

EXAMPLE 2

Figure 2:
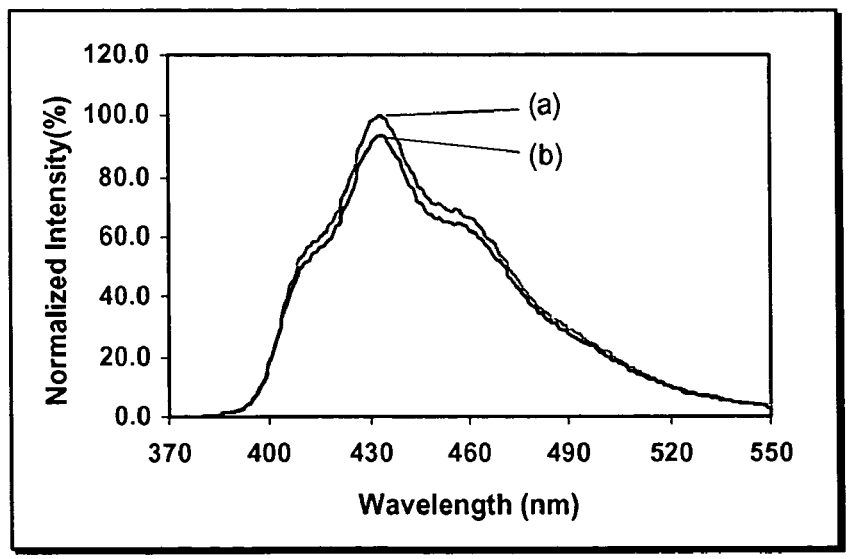
FIG. 2 shows the luminescent spectra of the luminescent composition containing UVITEX OB and poly(methylmethacrylate) of Example 2, which was coated on polyester film and imaged with a triple Nd:YAG laser at (a) 0 mJ/cm$^2$ and (b) 190.0 mJ/cm$^2$.

Five hundred milligrams (500 mg) of Uvitex OB (available from Ciba Specialty Chemicals) were dissolved in 200 ml toluene solution containing 20 grams poly(methylmethacrylate) (Molecular weight 120,000, available from Sigma Aldrich). The solution was coated on Mylar film using wire-wound bar. Uniform colorless film was obtained after drying with hot air gun. When excited with ultraviolet light (i.e., 370 nm), the film emits a bright blue color light and the luminescent spectrum shows the fluorescent peak at 430 nm. The film was then imaged using a triple Nd-YAG laser (355 nm) at different energy densities. No visual color change was observed with the naked eyes. Upon exposure to deciphering ultraviolet light (i.e., 370 nm), the luminescent color of the image area was almost unchanged even after laser imaging with 190 mJ/cm$^2$, as shown in FIG. 2.

This example shows that the fluorescent peak of Uvitex OB as the only luminescent compound in coating loses only a few percent of its fluorescent intensity upon exposure to laser light at 190 mJ/cm$^2$.

EXAMPLE 3

Figure 3:
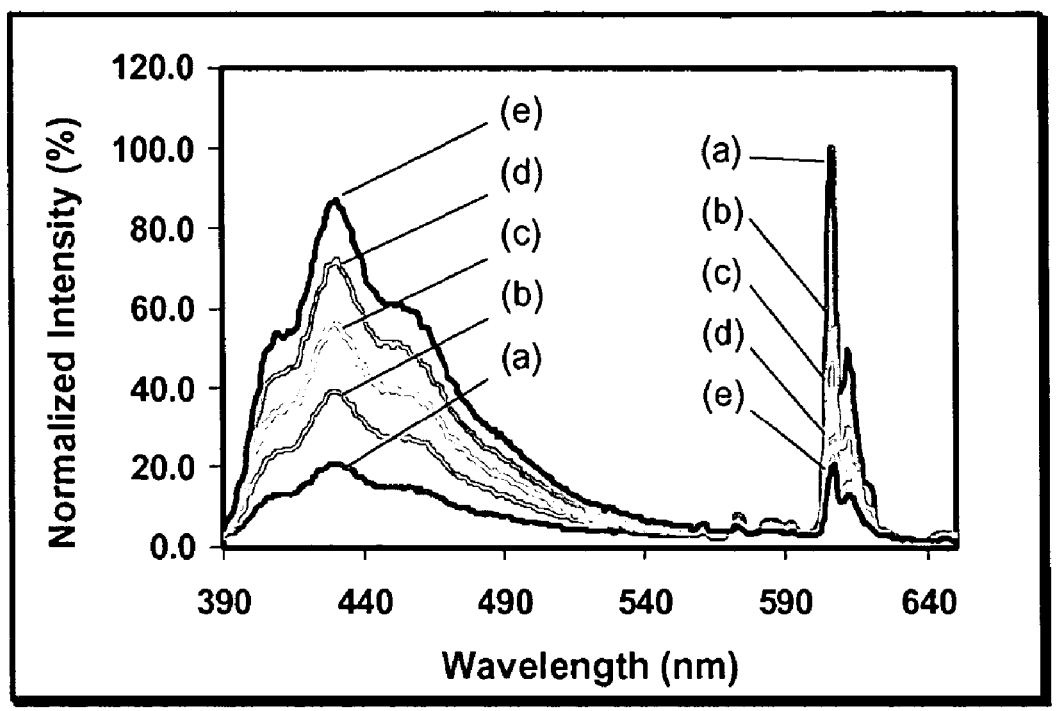
FIG. 3 shows the luminescent spectra of the luminescent composition containing tris(dibenzoylmethane)mono(phenanthroline)europium (III), UVITEX OB and poly(m- ethylmethacrylate) of Example 3, which was coated on polyester film and imaged with a triple Nd:YAG laser at (a) 0 mJ/cm$^2$, (b) 57.0 mJ/cm$^2$, (c) 95.0 mJ/cm$^2$, (d) 142.5 mJ/cm$^2$, and (e) 190.0 mJ/cm$^2$.

Five hundred milligrams of tris(dibenzoylmethane)mono (phenanthroline)-europium (III) (ADS051RE, available from American Dye Source, Inc.) and six hundred milligrams of Uvitex OB (available from Ciba Specialty Chemicals) were dissolved in 200 ml toluene solution containing 20 grams poly(methylmethacrylate) (Molecular weight 120,000, available from Sigma Aldrich). The solution was coated on Mylar film using wire-wound bar. Uniform colorless film was obtained after drying with hot air gun. When excited with ultraviolet light (i.e., 370 nm), the film emits a bright red color light and the luminescent spectrum shows two emission peaks at 430 nm and 612 nm. The former luminescent emission peak is the fluorescent characteristic of Uvitex OB, while the later is the fluorescent peak of ADS051RE, respectively. The film was then imaged using a triple Nd-YAG laser (355 nm) at different energy densities. No visual color change was observed with the naked eyes. However, upon exposure to deciphering ultraviolet light (i.e., 370 nm), the luminescent color of the imaged area changes gradually from red to blue with increasing laser imaging energy density. FIG. 3 shows the luminescent spectra of the image area with different laser imaging energy densities. FIG. 4 shows the changes in the intensity of the luminescent peaks at 430 nm and 612 nm, respectively, upon increasing laser imaging densities applied to the film.

Firstly, this example demonstrated an energy transfer (or FRET) from a blue emitting donor (Uvitex OB) to a red emitting acceptor (europium complex). Indeed, without any laser exposure (a), the fluorescence peaks of europium and Uvitex OB have an intensity of 100% and 20%, respectively, which means that the energy emitted by Uvitex OB has been absorbed by the europium complex, allowing it to emit a brighter red color.

Secondly and surprisingly, this example of a combination between Uvitex and europium complex shows a drastic decrease of the intensity of the europium complex fluorescence peak upon exposure to increasing laser imaging doses. Indeed, the fluorescent intensity of europium complex loses up to 80% upon exposure to laser light at 190.0 mJ/cm$^2$, as compared to only 40% when europium complex is alone in the coating, whereas Uvitex fluorescence peak intensity nearly recovers its highest level. This is an indication of the rapid degradation of the europium complex that is thus no more capable of absorbing energy from Uvitex. Therefore, the blue fluorescence of Uvitex re-appears and brightens up, as the laser imaging density increases.

Thirdly, this example shows that by varying the laser imaging doses, the variation between red and blue fluorescent colors can be easily controlled. As shown in FIG. 4, the "shift" point between red and blue for the specific combination of Uvitex OB and europium is around 70.0 mJ/cm$^2$.

EXAMPLE 4

Three hundred milligrams of tris(dibenzoylmethane)mono(phenanthroline)-europium (III) (ADS051RE, available from American Dye Source, Inc.) and seven hundred milligrams of polyvinyl carbazole (Molecular weight 28,000, available from Sigma Aldrich) were dissolved in 200 ml toluene solution. The solution was coated on Mylar film using wire-wound bar. Uniform colorless film was obtained after drying with hot air gun. When excited with ultraviolet light (i.e., 370 nm), the film emits a bright red color light and the luminescent spectrum shows only one luminescent peak at 612 nm, which is the fluorescent peak of ADS051RE. This indicated that the fluorescence of polyvinyl carbazole was completely quenched by ADS051RE. The film was then imaged using a triple Nd-YAG laser (355 nm) at different energy densities. No visual color change was observed with the naked eyes. However, upon exposure to deciphering ultraviolet light (i.e., 370 nm), the luminescent color of the film changes gradually from red to colorless with increasing laser energy density. FIG. 5 shows the luminescent spectra of the image area with different laser imaging doses. FIG. 6 shows the changes on the luminescent intensity at 612 nm with the laser imaging energy density.

In comparison to the results obtained from Example 1, the presence of polyvinyl carbazole in the luminescent compositions is greatly increasing the laser imaging speed. Indeed, europium alone loses 40% intensity in its fluorescence peak when the laser imaging energy density is at 190 mJ/cm$^2$, whereas it reaches the same level with only 50 mJ/cm$^2$ when in presence of polyvinyl carbazole.

EXAMPLE 5

Three hundred milligrams of tris(dibenzoylmethane)mono(phenanthroline)-europium (III) (ADS051RE, available from American Dye Source, Inc.) and seven hundred milligrams of poly[2-(6-cyano-6-methylheptyloxy)-1,4-phenylene] (ADS120BE, available from American Dye Source, Inc) were dissolved in 200 ml toluene. The solution was coated on Mylar film using wire-wound bar. Uniform colorless film was obtained after drying with hot air gun. When excited with ultraviolet light (i.e., 370 nm), the film emits a bright red color light and the luminescent spectrum shows only one luminescent peak at 612 nm, which is the fluorescent peak of ADS051RE. This indicated that the fluorescent peak of ADS120BE was completely quenched by ADS051RE. The film was then imaged using a triple Nd-YAG laser (355 nm) at different energy densities. No visual color change was observed with the naked eyes. However, upon exposure to deciphering ultraviolet light (i.e., 370 nm), the luminescent color of the film changes gradually from red to colorless with increasing laser energy densities. FIG. 7 shows the luminescent spectra of the image area with different laser imaging doses.

This example is similar to Example 3 in that a conjugated polymer, such as poly[2-(6-cyano-6-methylheptyloxy)-1,4-phenylene], which exhibits fluorescence at around 400 nm also participates in FRET process and increases the laser imaging speed.

EXAMPLE 6

Nine hundred milligrams of tris(dibenzoylmethane)mono(phenanthroline)-europium (III) (ADS051RE, available from American Dye Source, Inc.) and one hundred milligrams of poly(9,9-dioctylfluorenyl-2,7-diyl) (ADS129BE, available from American Dye Source, Inc) were dissolved in 200 ml toluene. The solution was coated on Mylar film using wire-wound bar. Uniform light yellow film was obtained after drying with hot air gun. When excited with ultraviolet light (i.e., 370 nm), the film emits a bright pink color light and the luminescent spectrum shows three luminescent peaks. The two peaks at 440 nm and 465 nm correspond to the fluorescent peaks of ADS129BE and the peak at 612 nm is the fluorescent peak of ADS051RE. The film was then imaged using a triple Nd-YAG laser (355 nm) at different energy densities. No visual color change was observed with the naked eyes. However, upon exposure to deciphering ultraviolet light (i.e., 370 nm), the luminescent color of the film changes gradually from pinkish to colorless with increasing laser energy density. FIG. 8 shows the luminescent spectra of the image area with different laser imaging doses.

This example shows that yet another conjugated polymer present in the composition with an europium complex helps speeding the laser imaging step. Indeed, the europium peak reaches about 65% intensity with only 76 mJ/cm$^2$.

EXAMPLE 7

Five hundred milligrams of poly[2-methoxy-5-(2-ethyl-hexyloxy)-1,4-phenylene vinylene] (ADS100RE, available from American Dye Source, Inc.) were dissolved in 100 ml of toluene. The solution was coated on a glass slide. Uniform orange film was obtained after drying with hot air gun. When excited with ultraviolet light (i.e., 370 nm), the film emits a bright orange color light and the luminescent spectrum shows one luminescent peak at 570 nm. The film was then imaged using a triple Nd-YAG laser (355 nm) at different energy densities. No visual color change was observed with the naked eyes. However, upon exposure to deciphering ultraviolet light (i.e., 370 nm), the luminescent color at the imaged area gradually became colorless with increasing laser energy density. FIG. 9 shows the luminescent spectra of the image area with different laser imaging doses.

Similarly to Example 1, this example shows that the fluorescent peak of the phenylene vinylene polymer as the only luminescent compound in solution loses up to 60% upon exposure to laser light at 190.0 mJ/cm$^2$.

EXAMPLE 8

Five hundred milligrams of poly[2-methoxy-5-(2-ethyl-hexyloxy)-1,4-phenylene vinylene] (ADS100RE, available from American Dye Source, Inc.) and 1 gram of UVITEX OB were dissolved in 100 ml of toluene. The solution was coated on a glass slide. Uniform orange film was obtained after drying with hot air gun. When excited with ultraviolet light (i.e., 370 nm), the film emits a bright orange color light and the luminescent spectrum shows only one luminescent peak at 570 nm. This indicated that the fluorescence of UVITEX OB was completely quenched by ADS100RE. The film was then imaged using a triple Nd-YAG laser (355 nm) at different energy densities. No visual color change was observed with the naked eyes. However, upon exposure to deciphering ultraviolet light (i.e., 370 nm), the luminescent color at the imaged area gradually became colorless as increasing the laser energy density. FIG. 10 shows the luminescent spectra of the imaged area at different energy densities. FIG. 11 shows the changes on the luminescent intensity at 570 nm with the laser imaging energy density.

In comparison to the results obtained from Example 7, the presence of UVITEX OB in the luminescent compositions is greatly increasing the laser imaging speed. Indeed, the phenylene vinylene polymer alone loses 60% intensity in its fluorescence peak when the laser imaging density is 190 mJ/cm$^2$, whereas it reaches the same level with only 50 mJ/cm$^2$ when in presence of UVITEX OB (see FIG. 11).

EXAMPLE 9

Five hundred miligram of Uvitex OB (available from Ciba Specialty Chemicals), one hundred miligram of tris(dibenzoylmethane)mono(phenanthroline)europium (III)

(ADS051RE, available from American Dye Source, Inc.) and 50.0 grams of polymethylmethacrylate (Molecular weight 120,000, available from Sigma Aldrich) were melt mixed at 140° C. under nitrogen atmosphere. The mixture was then casted into a uniform sheet having a thickness of 1.0 mm, which was transparent and colorless after cooling to room temperature. When excited with ultraviolet light (i.e., 370 nm), the film emits a bright red color light and the luminescent spectrum shows two emission peaks at 430 nm and 612 nm. The former luminescent emission peak is the fluorescent characteristic of Uvitex OB, while the later is the fluorescent peak of ADS051RE. The film was then imaged using a triple Nd-YAG laser (355 nm) at the energy density of 200 mJ/cm$^2$. No visual color change was observed with the naked eyes. However, upon exposure to deciphering ultraviolet light (i.e., 370 nm), the luminescent color of the imaged area changes from red to blue with increasing laser energy density.

The interpretation of this example is similar to that of Example 3 with different proportions of UVITEX OB and europium complex, allowing to have a discernable color change from red to blue under UV light, upon laser imaging. Only a low proportion of the costly europium complex is thus necessary to reach the improved efficiency in laser imaging as contemplated by the present invention. Moreover, such red-blue color change, known in the prior art to be difficult to obtain, constitutes another great advantage of the present invention in view of applications such as full-color displays.

EXAMPLE 10

The conditions of this example are the same as in example 5 except for the high intensity photon source. The film was imaged using a 2000 W mercury lamp (365 nm) at different energy densities, namely 200, 500 and 900 mJ/cm$^2$. No visual color change was observed with the naked eyes. However, upon exposure to deciphering ultraviolet light (i.e., 370 nm), the luminescent color of the imaged area changes gradually from red to blue with increasing laser energy density. FIG. 12 shows the luminescent spectra of the image area with different imaging energy densities.

EXAMPLE 11

Five hundred milligrams of metal complex polymer (ADS500RE, available from American Dye Source, Inc.) having the structure as shown below:

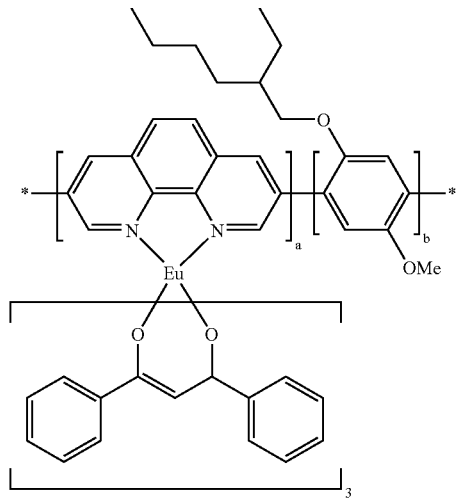

Molar ratios:
a = 0.30
b = 0.70 were dissolved in 100 ml of toluene. The solution was coated on a glass slide. Uniform colorless film was obtained after drying with hot air gun. When excited with ultraviolet light (i.e., 370 nm), the film emits a bright red color light and the luminescent spectrum shows only one luminescent peak at 612 nm. The film was then imaged using a triple Nd-YAG laser (355 nm) at different energy densities. No visual color change was observed with the naked eyes. However, upon exposure to deciphering ultraviolet light (i.e., 370 nm), the luminescent color at the imaged area gradually became blue having the emission maximum at 436 nm upon increasing the laser imaging dose from 0 to 190 mJ/cm$^2$.

EXAMPLE 12

Five hundred milligrams of metal complex polymer (ADS510GE, available from American Dye Source, Inc.) having the structure as shown below:

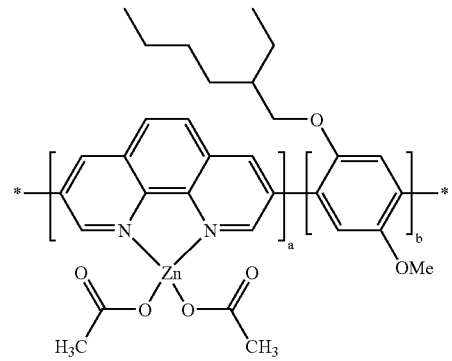

Molar ratios:
a = 0.30
b = 0.70 were dissolved in 100 ml of toluene. The solution was coated on a glass slide. Uniform colorless film was obtained after drying with hot air gun. When excited with ultraviolet light (i.e., 370 nm), the film emits a bright green color light and the luminescent spectrum shows only one luminescent peak at 538 nm. The film was then imaged using a triple Nd-YAG laser (355 nm) at different energy densities. No visual color change was observed with the naked eyes. However, upon exposure to deciphering ultraviolet light (i.e., 370 nm), the luminescent color at the imaged area gradually became blue having the emission maximum at 436 nm upon increasing the laser imaging dose from 0 to 190 mJ/cm$^2$.

EXAMPLE 13

Ten grams of the luminescent composition of Example 3 were dissolved into 100 grams of an adhesive solution available from National Starch and Chemical Company (Dual-Tak 80-1174, New Jersey, USA). The adhesive solution was then coated onto a polypropylene film using a wire-wound rod. The adhesive coated luminescent film was dried at 70° C. using hot air blower and then cut into a thin strip (5 mm width). The luminescent strip was used as a tear tape for packaging purposes, such as in cigarette packs, perfume boxes, CD/DVD packs and other products. The information was digitally recorded onto the luminescent strip using a triple YAG laser (available from Spectra Physics) having an emission at 365 nm at an energy density of 150 mJ/cm$^2$. The recorded red and blue images from the luminescent strips were clearly appearing upon exposure to a black lamp.

EXAMPLE 14

The solution from example 3 was coated on a Mylar film using a wire-wound bar. A uniform colorless film was obtained after drying with a hot air gun. The film was then laminated on a card (plastic or cardboard) using a GBC Docu-Seal 125 to get a credit card like document. The information was digitally recorded onto the luminescent card using a triple YAG laser (available from Spectra Physics) having an emission at 365 nm with an energy density of 150 mJ/cm$^2$ (The digital imaging of the film can also be done prior to lamination). The red and blue images were clearly visible on the card upon exposure to a black lamp.

EXAMPLE 15

A light emitting diode was made as following configuration: (ITO/PEDOT:PSS/emissive layer/CaMg/Al). A 80 nm thick film of Poly(styrenesulfonate)/poly(2,3-dihydrothieno (3,4-b)-1,4-dioxin) (PEDOT: PSS available from Aldrich) was deposited onto an ITO-coated glass substrate by spin-coating a 1.3% dispersion of PEDOT:PSS in water at 3000 rpm and dried under hot air stream at 100° C. The 110 nm thick emissive layer was deposited on top of the PEDOT:PSS layer by spin-coating a toluene solution containing 0.95% poly[2-(6-cyano-6-methylheptyloxy)-1,4-phenylene] (ADS120BE, available from American Dye Source, Inc.) and 0.05% tris(dibenzoylmethane)mono (phenanthroline)europium (III) (ADS051RE, available from American Dye Source, Inc.) at 3000 rpm and dried under hot air stream at 100° C. The low work function electrodes were deposited on top of the emissive layer by vapor deposition through a shadow mask at 1×10$^{-6}$ Torr. A half of the light emitting diode was then exposed using a triple YAG laser (available from Spectra Physics) having an emission at 365 nm with an energy density of 200 mJ/cm$^2$ through the ITO side. The exposed light emitting diode was then turned on using a bias of 20 V. The exposed area emits blue light, while the unexposed area emits area light.

REFERENCES

1. McGehee, M. D., Bergstedt, T., Zhang, C., Saab, A. P., O'Regan M. B., Bazan, G. C., Srdanov, V. I., Heeger, A. J. *Narrow Bandwidth Luminescence from Blends with Energy Transfer from Semiconducting Conjugated Polymers to Europium Complexes*, Advanced Materials 1999, 11 (16).
2. Trattnig, G., Pogantsch, A., Langer, G., Kern, W., Zojer E. *Polymer-based red, green, and blue emitting devices fabricated by reductive photopatterning*, Applied Physics Letters 2002, 81 (22).

The invention claimed is:

1. A method for recording information in a luminescent composition, comprising:
    a) providing a luminescent composition which comprises, in a suitable carrier or diluent, at least a first and second luminescent compounds, wherein the first luminescent compound is a donor luminescent compound having a peak luminescent emission spectrum at a given wavelength, wherein the second luminescent compound is an acceptor luminescent compound having a peak absorption spectrum at a longer wavelength than the given wavelength, and wherein the emission spectrum of the donor luminescent compound at least partially overlaps the absorption spectrum of the acceptor luminescent compound, wherein said donor and acceptor luminescent compounds are selected from the group consisting of a conjugated organic material, a non-conjugated organic material, an optical brightener and an organic metal complex;
    b) combining said composition with a substrate, so that at least a portion of the composition is available for exposure to a photon source, and;
    c) embedding information at predetermined sites in said combined composition by localized exposure to a photon source, said embedding resulting in an information pattern when exposed to a luminescence deciphering device.

2. The method according to claim 1, wherein combining is layering said composition onto the substrate.

3. The method according to claim 2, wherein said layering is made onto a film.

4. The method according to claim 3, further comprising, before or after step (c) an additional step of (d) laminating said film onto a secondary substrate.

5. The method according to claim 4, wherein said secondary substrate is selected from the group consisting of plastic, cardboard, paper, metal, wood, glass and ceramic.

6. The method according to claim 2, wherein said layering is made by coating.

7. The method according to claim 2, wherein said layering is made by jetting.

8. The method according to claim 2, wherein said layering is made by spraying.

9. The method according to claim 1, wherein combining is incorporating said composition into the substrate.

10. The method of claim 9, wherein combining is incorporating said composition into the bulk of a polymeric object.

11. The method of claim 10, wherein said incorporating comprises melt mixing said composition to the bulk of said polymeric object.

12. The method of claim 10, wherein said incorporating comprises a solvent-casting technique.

13. The method of claim 10, wherein said incorporating comprises a hot melt casting technique.

14. The method of claim 10, wherein said incorporating comprises an extrusion technique.

15. The method of claim 10, wherein said incorporating comprises a laminating technique.

16. The method according to claim 1, wherein said composition comprises a conjugated organic material, said conjugated organic material is selected from the group consisting of dimers, oligomers, polymers, copolymers and dendrimers, which contain monomer units derived from phenylene, biphenylene, naphthalene, anthracene, fluorene, bifluorene, spirofluorene, phenylene-vinylene, carbazole, pyrene, arylamine, thiophene, bithiophene, benzo(2,1',3)thiadiazol, phenanthroline and their derivatives.

17. The method according to claim 16, wherein said conjugated organic material is selected from the group consisting of the following formulas:

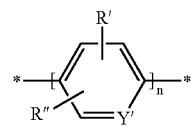

-continued
2
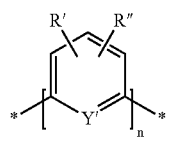
3
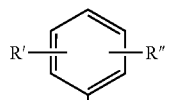
4
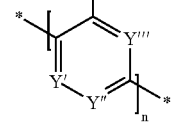
5
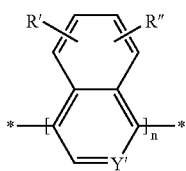
6
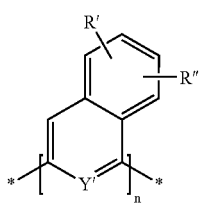
7
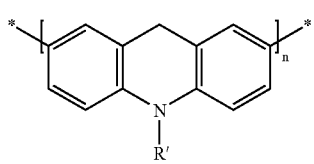
8
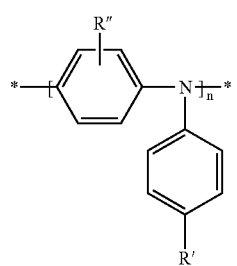
-continued
9
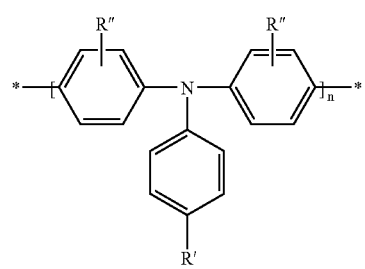
10
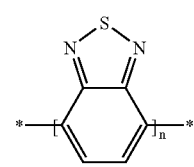
11
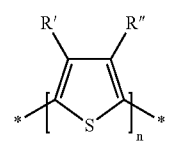
12
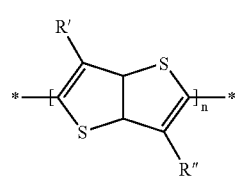
13
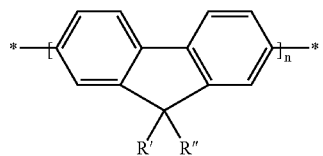
14
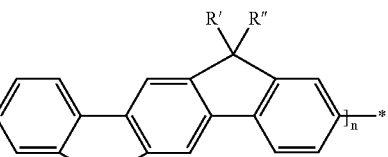
15
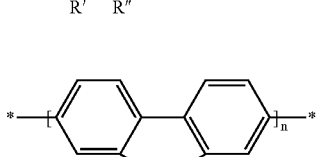

-continued
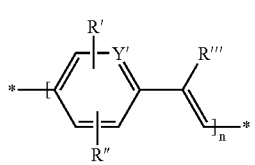
16
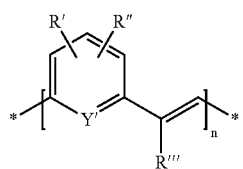
17
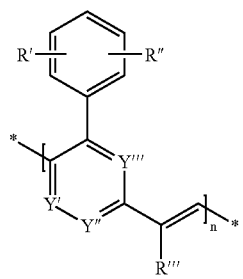
18
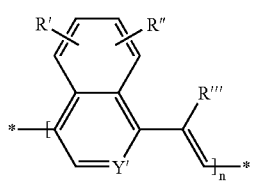
19
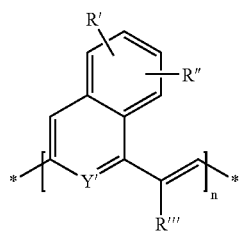
20
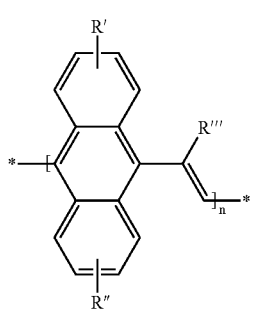
21
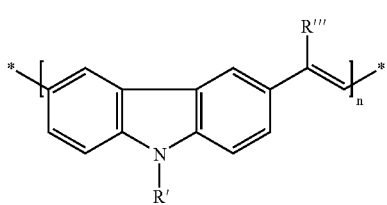
22
-continued
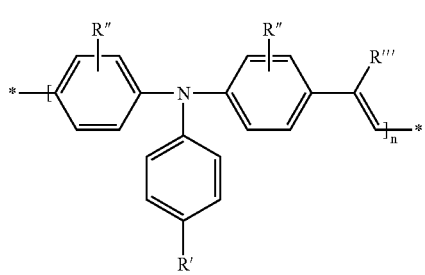
23
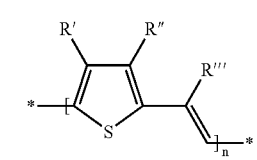
24
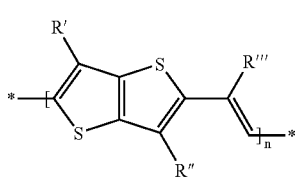
25
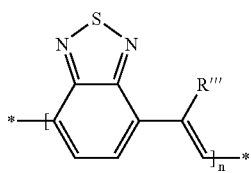
26
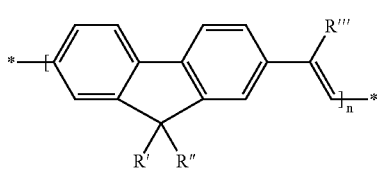
27
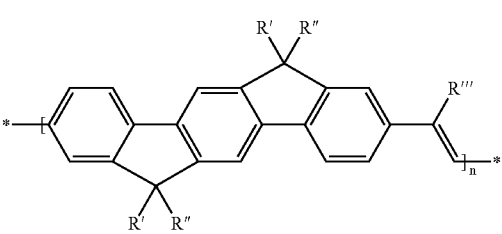
28
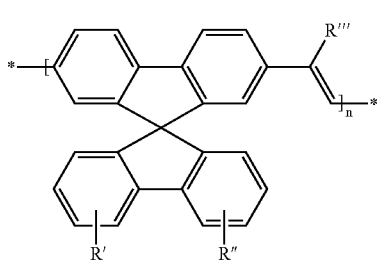
29

-continued

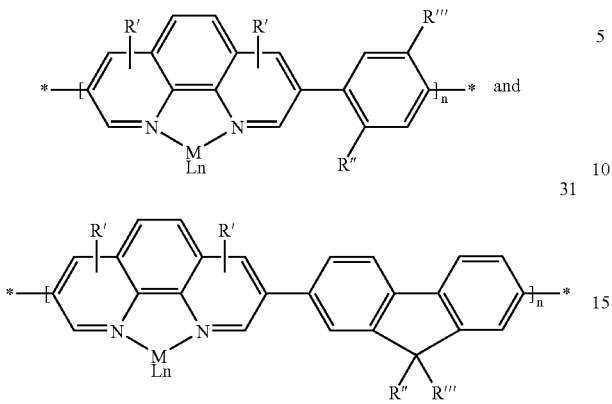

30

31 wherein:
R' and R" are identical or different, each a straight-chain or branched or cyclic alkyl, where one or more non-adjacent CH$_2$ groups are optionally replaced by —S—, —CO—, —COO—, —O—CO—, —NR$^1$—, —(NR$^2$ R$^3$)$^+$A$^-$-, or —CONR$^4$— or a straight-chain or branched or cyclic alkoxy group having 1 to 20 carbon atoms where one or more non-adjacent CH$_2$ groups are replaced by —O—, —S—, —CO—, —COO—, —O—CO—, —NR$^1$—, —(NR$^2$ R$^3$)$^+$A$^-$-, or —CONR$^4$— and one or more H atoms in each case may be replaced by F, or else CN, F, Cl or any aryl group having from 4 to 14 carbon atoms which are optionally substituted by one or more non-aromatic radicals;
R'" is H or CN;
R$^1$, R$^2$, R$^3$, R$^4$: identical or different, aliphatic or aromatic hydrocarbon radicals having from 1 to 20 carbon atoms or H;
Y', Y", Y'" are identical or different and are CH or N;
n varies from 2 to 1,000,000;
M Ln is the metal complex, which derives from LiBr, Mg(OCOCH$_3$)$_2$, Zn(OCOCH$_3$)$_2$, Al$_2$(SO$_4$)$_3$, FeCl$_3$, CoCl$_2$, NiCl$_2$, CuCl$_2$, PdCl$_2$, AgPF$_6$ or LaCl$_3$.

18. The method according to claim 17, wherein M Ln has one of the following formula:

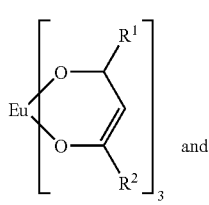

32

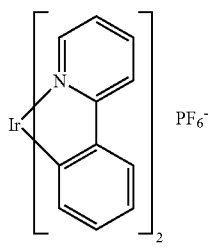

33 wherein R$^1$ and R$^2$, identical or different, are selected from the group consisting of H, aliphatic hydrocarbon radicals and aromatic hydrocarbon radicals having from 1 to 20 carbons.

19. The method according to claim 18, wherein said conjugated organic material is selected from the group consisting of:
4,4'-Bis(9-ethyl-3-carbazolevinylene)-1,1'-biphenyl;
9,10-Bis[(9-ethyl-3-carbazoyl)-vinylenyl]-anthracene;
4,4'-Bis(diphenylvinylenyl)-biphenyl;
1,4-Bis(9-ethyl-3-carbazolvinylene)-2-methoxy-5-(2-ethylhexyloxy)-benzene;
1,4-Bis(9-ethyl-3-carbazolvinylene)-2,5-di(2-ethylhexyloxy)-benzene;
4,4'-Bis(diphenylvinylenyl)anthracene;
1,4-Bis(9-ethyl-3-carbazovinylene)-9,9-dihexylfluorene; and
1,4-Bis(9-ethyl-3-carbazovinylene)-9,9-dioctylfluorene.

20. The method according to claim 1, wherein said photon source is provided by a laser light.

21. The method according to claim 20, wherein the photon source has an energy density ranging from 20 to 200 mJ/cm$^2$.

22. The method according to claim 21, wherein the photon source has an energy density ranging from 50 to 200 mJ/cm$^2$.

23. The method according to claim 1, wherein said photon source is provided by a UV light.

24. The method according to claim 23, wherein the UV light has an energy density ranging from 200 to 900 mJ/cm$^2$.

25. The method according to claim 23, wherein said photon source is provided by a mercury lamp.

26. The method according to claim 1, wherein said composition comprises an optical brightener, said optical brightener is selected from the group consisting
2,5-thiophenediylbis(5-tert-butyl-1,3-benzoxazole),
a mixture of 2,5-thiophenediylbis(5-tert-butyl-1,3-benzoxazole) and calcium carbonate,
a mixture of 2,5-thiophenediylbis(5-tert-butyl-1,3-benzoxazole) and dicyclohexylphthalate,
4,4'-bis(2-sulfostyryl)-biphenyl disodium salt,
4,4'-bis(2-methoxystyryl)-1,1'-biphenyl),
a mixture of 4,4'-bis(2-methoxystyryl)-1,1'-biphenyl and calcium carbonate,
hexasodium-2,2'-[vinylenebis[3-sulfonato-4,1-phenylene)imino[6-(diethylamino)-1,3,5-triazine-4,2-diyl]imino]]bis(benzene-1,4-disulphonate),
4,4'-bis(triazin-2-ylamino)stilbene-2,2'-disulfonic acid derivatives,
mono(azol-2-yl) stilbenes,
bis(azol-2-yl)stilbenes,
styryl derivatives of benzene and biphenyl,
pyrazolines,
bis(benzazol-2-yl) derivatives having as phenyl ring substituents alkyl, COO-alkyl, and SO$_2$-alkyl,
bis(benzoxazol-2-yl) derivatives,
bis(benzimidazol-2-yl) derivatives,
coumarins,
carbostyrils,
naphthalimides,
alkoxynaphthalimides,
derivatives of dibenzothiophene-5,5-dioxide,
pyrene derivatives, and
pyridotriazoles.

27. The method according to claim 26, wherein said optical brightener is selected from the group consisting of 4,4'-bis (triazin-2-ylamino)stilbene-2,2'-disulfonic acid derivatives wherein the triazinyl groups are substituted with substituents selected from the group consisting of anilino, sulfanilic acid, metanilic acid, methylamino, N-methyl-N-hydroxyethylamino, bis(hydroxyethylamino), morpholino, diethylamino, and the like, 2-(stilben-4-yl)naphthotriazoles, 2-(4-phenyl-stilben-4-yl )benzoxazoles, 4,4'-bis(triazol-2-yl)stilbene-2,2'-disulfonic acids, 1,4-bis(styryl)benzenes, 4,4'bis(styryl) biphenyls, 1,3-diphenyl-2-pyrazolines; bis(benzazol-2-yl) derivatives having as phenyl ring substituents alkyl, COO-alkyl, and $SO_2$alkyl; bis(benzoxazol-2-yl) derivatives, 2-(benzofuran-2-yl)benzimidazoles, 7-hydroxy and 7-(substituted amino) coumarins, 4-methyl-7-amino-coumarin derivatives, esculetin, β-methylumbelliferone, 3-phenyl-7-(triazin-2-ylamino)coumarins, 3-phenyl-7-aminocoumarin, 3-phenyl-7-(azol-2-yl)coumarins, and 3,7-bis(azolyl)coumarins, carbostyrils, naphthalimides, alkoxynaphthalimides, derivatives of dibenzothiophene-5,5-dioxide, pyrene derivatives, and pyridotriazoles.

28. The method according to claim 1, wherein said composition comprises an organic metal complex', said organic metal complex is derived from elements selected from the group consisting of europium, zinc, iridium, aluminum, gallium and terbium, and mixtures thereof.

29. The method according to claim 28, wherein said organic metal complex is selected from the group consisting of:
Tris(benzoylacetonato)mono(phenanthroline)europium (III);
Tris(dibenzoylmethane)mono(phenanthroline)europium (III);
Tris(dibenzoylmethane)mono(5-aminophenanthroline) europium (III);
Tris(dinaphthoylmethane)mono(phenanthroline)europium (III);
Tris(dibiphenoylmethane)mono(phenanthroline)europium (III);
Tris(dibenzoylmethane)mono(4,7-dimethylphenanthroline)europium (III);
Tris(dibenzoylmethane)mono(4,7-diphenylphenanthroline)europium (III);
Bis(8-hydroxyquinolato)zinc;
Bis(2-methyl-8-hydroxyquinolato)zinc;
Iridium (III) tris(2-phenylpyridinato-N,C2')picolate;
Iridium (III) tris(2-(4-tolyl)pyridinato-N,C2')picolinate;
Iridium (III) bis(2-(4,6-difluorophenyl)pyridinato-N,C2');
Iridium (III) bis(2-(2'-benzothienyl)pyridinato-N,C3') (acetylacetonate);
Tris(8-hydroxyquinolato)aluminium (III);
Tris(2-methyl-8-hydroxyquinolato)aluminium (III);
Tris(8-hydroxyquinolato)gallium (III);
Tris(2-methyl-8-hydroxyquinolato)gallium (III); and
Tris(3-methyl-1-phenyl-4-trimethyl-acetyl-5-pyrazoline) terbium (III).

30. The method according to claim 1, wherein said composition further comprises polymeric binder resins and/or organic stabilizers.

31. The method according to claim 30, wherein said composition comprises said polymeric binder resins and said polymeric binder resins are selected from the group consisting of meth(acrylate) polymers, urethane polymers, carbonate polymers, ester polymers, amide polymers and other engineering plastics.

32. The method according to claim 30, wherein said composition comprises said organic stabilizers and said organic stabilizers are selected from the group consisting of
a mixture of bis(1,2,2,6,6-pentamethyl-4-piperidyl) sebacate; and methyl 1,2,2,6,6-pentamethyl-4-piperidyl sebacate,
bis(1,2,2,6pentamethyl-4piperindinyl-3,5-bis(1,1-dimethylethyl)-4-hydroxyphenylmethylbutylmalonate,
decanedioic acid, bis(2,2,6,6-tetramethyl-1-(octyloxy)4-piperidinyl) ester, reaction products with 1,1-dimethylethylhydroperoxide; and octane,
2-(2H-benzotriazol-2-yl)-4,6-ditertpentylphenol,
3-(2H-benzotriazol-2-yl )-5-t-butyl-4-hydroxybenzenepropanoic acid,
2-[2-hydroxy-3,5-bis-(1,1-dimethylbenzyl) phenyl]-2H-benzotriazole,
2-(2H-benzotriazol-2-yl)-6-(1-methyl-1-phenylethyl)-4-(1,1,3-,3-tetramethylbutyl) phenol,
a-[3-[3-(2H-benzotriazol-2-yl)-5-t-butyl-4-hydroxyphenyl]-1-oxopropyl]-w-hydroxypoly (oxy-1,2-ethanediyl) and a-[3-[3-(2H-benzotriazol-2-yl)-5-t-butyl-4-hydroxyphenyl]-1-oxopropyl]-w-[3-[3-(2H-benzotriazol-2-yl)-5-t-butyl-4-hydroxy phenyl]-1-oxoprop-oxy]poly(oxy-1,2-ethanediyl),
2-[4-((2-Hydroxy-3-dodecyloxypropyl)oxy)-2-hydroxyphenyl]-4,6-bis(2,4-dimethylphenyl)-1,3,5-triazine,
tetrakis-(methylene-(3 ,5-di-terbutyl-4-hydrocinnamate) methane),
octadecyl 3,5-di-(tert)-butyl-4-hydroxyhydrocinnamate,
thiodiethylene bis (3,5-di-tert-butyl-4-hydroxyhydrocinnamate),
1,2-bis(3,5-di-tert-butyl-4-hydroxyhydrocinnamolly)hydrazine,
a mixture of tris(2,4-di-(tert)-butylphenyl)phosphite and tetrakis-methylene-(3,5-di-terbutyl-4-hydrocinnamate) methane),
a mixture of 50% tris(2,4-di-(tert)-butylphenyl)phosphite and 50% octadecyl 3,5-di-(tert)-butyl-4-hydroxyhydrocinnamate,
a mixture of 66% (tris(2,4-butylphenyl)phosphate and 33% octadecyl 3,5-di-(tert)-butyl-4-hydroxyhydrocinnamate,
alkylammonium salt of (2-benzothiazolylthio) succinic acid,
1-(benzothiazol-2-ylthio) succinic acid,
4-oxo-4-p-tolylbutyric acid adduct with 4-ethylmorpholine, and
zirconium complex with 4-methyl-g-oxo-benzene-butanoic acid.

33. The method according to claim 1, wherein said composition comprises a non-conjugated organic material, said non-conjugated organic material is selected from the group consisting of dimers, oligomers, polymers, copolymers and dendrimers, which contain monomer units derived from acrylate, methacrylate, styrene, epoxide, vinyl alcohol, carbonate, amide and urethane, and contains fluorescent and/or phosphorescent pendant groups or end groups selected from the group consisting of carbazole, pyrene, anthracene, thioxanthone, pyrelene imide, xanthane, europium complexes, iridium complexes, aluminum complexes, ruthenium complexes and zinc complexes.

34. The method according to claim 1, wherein said first and second luminescent compounds are combined as a single complex material.

35. The method according to claim 1, wherein said composition exhibits peak luminescent properties at emission wavelengths between 370 and 1100 nm.

36. The method according to claim 1, wherein the acceptor luminescent compound is tris(dibenzoylmethane)mono (phenanthroline)-europium (III) (ADS051RE™) and the donor luminescent compound is 2,5-thiophenediylbis(5-tert-butyl-1,3-benzoxazole).

37. The method according to claim 1, wherein the acceptor luminescent compound is tris(dibenzoylmethane)mono(phenanthroline)-europium (III) (ADS051RE™) and the donor luminescent compound is polyvinyl carbazole.

38. The method according to claim 1, wherein the acceptor luminescent compound is tris(dibenzoylmethane)mono(phenanthroline)-europium (III) (ADS051RE™) and the donor luminescent compound is poly[2-(6-cyano-6-methyl-heptyloxyl)-1,4-phenylene](ADS129BE™).

39. The method according to claim 1, wherein the acceptor luminescent compound is tris(dibenzoylmethane)mono(phenanthroline)-europium (III) (ADS051RE™) and the donor luminescent compound is poly(9,9-dioctylfluorenyl-2,7-diyl) (ADS129BE™).

40. The method according to claim 1, wherein the acceptor luminescent compound is poly[2-methoxy-5-(2-ethylhexyloxy)-1,4-phenylene vinylene](ADS100RE™) and the donor luminescent compound is 2,5-thiophenediylbis(5-tert-butyl-1,3-benzoxazole).

41. The method according to claim 1, wherein said substrate is selected from the group consisting of plastic, paper, metal, wood, glass and ceramic.

42. The method according to claim 1, wherein said information is written information.

43. The method according to claim 1, wherein said information is graphical information.

44. The method according to claim 1, further comprising, after step (c) a step of (e) reading the information pattern in the composition by exposing said information to a luminescence deciphering device.

45. The method according to claim 1, wherein said luminescence deciphering device is selected from the group consisting of a low intensity UV radiation, a CCD camera, a black lamp, a laser light, and an applied electric field.

* * * * *